US010440768B2

(12) United States Patent
Fujishiro et al.

(10) Patent No.: US 10,440,768 B2
(45) Date of Patent: *Oct. 8, 2019

(54) MOBILE COMMUNICATION SYSTEM, CONTROL APPARATUS, BASE STATION, AND USER TERMINAL SUPPORTING DUAL CONNECTIVITY

(71) Applicant: KYOCERA CORPORATION, Kyoto (JP)

(72) Inventors: Masato Fujishiro, Yokohama (JP); Yushi Nagasaka, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,003

(22) Filed: Feb. 7, 2018

(65) Prior Publication Data
US 2018/0167994 A1 Jun. 14, 2018

Related U.S. Application Data

(63) Continuation of application No. 15/085,642, filed on Mar. 30, 2016, now Pat. No. 9,900,925, which is a (Continued)

(51) Int. Cl.
*H04W 28/02* (2009.01)
*H04W 76/16* (2018.01)
(Continued)

(52) U.S. Cl.
CPC ............. *H04W 76/16* (2018.02); *H04L 45/24* (2013.01); *H04W 28/0252* (2013.01);
(Continued)

(58) Field of Classification Search
CPC ......... H04W 28/0252; H04W 36/0027; H04W 72/12; H04W 36/28; H04W 76/27
See application file for complete search history.

(56) References Cited

U.S. PATENT DOCUMENTS 5,818,871 A    10/1998   Blakeney, II et al.
9,900,925 B2 *   2/2018   Fujishiro ................ H04L 45/24
(Continued)

FOREIGN PATENT DOCUMENTS

JP    H09502075 A    2/1997
JP    2012514427 A    6/2012
JP    2013085099 A    5/2013

OTHER PUBLICATIONS

R2-131327, "User Plane Architecture for Dual-Connectivity"; Apr. 15-19, 2013 (Year: 2013).*
(Continued)

*Primary Examiner* — Salvador E Rivas
(74) *Attorney, Agent, or Firm* — Studebaker & Brackett PC

(57) ABSTRACT

A first base station includes a controller configured to receive capability information from a user terminal for indicating whether a user terminal supports a first architecture using SCG bearer or an second architecture using a split bearer. The SCG bearer goes via both a serving gate way and the secondary base station without going via the first base station. The split bearer goes via both the serving gate way and the first base station and is split in a PDCP layer of the first base station. One split path of the split bearer goes via the second base station, and another split path of the split bearer goes via the first base station and not via the second base station. The controller configures either the SCG bearer or the split bearer without simultaneously configuring the bearers even if the user terminal indicates it supports both first and second architectures.

3 Claims, 10 Drawing Sheets

Related U.S. Application Data continuation of application No. PCT/JP2014/084124, filed on Dec. 24, 2014.

(60) Provisional application No. 61/934,424, filed on Jan. 31, 2014.

(51) Int. Cl.

| | | |
|---|---|---|
| *H04W 28/12* | (2009.01) | |
| *H04L 12/707* | (2013.01) | |
| *H04W 72/04* | (2009.01) | |
| *H04W 92/20* | (2009.01) | |
| *H04W 76/15* | (2018.01) | |
| *H04W 76/12* | (2018.01) | |
| *H04W 76/22* | (2018.01) | |
| *H04W 76/27* | (2018.01) | |

(52) U.S. Cl.
CPC ............ *H04W 28/12* (2013.01); *H04W 72/04* (2013.01); *H04W 76/12* (2018.02); *H04W 76/15* (2018.02); *H04W 92/20* (2013.01); *H04W 76/22* (2018.02); *H04W 76/27* (2018.02)

(56) References Cited

U.S. PATENT DOCUMENTS

| | | |
|---|---|---|
| 2010/0165896 A1 | 7/2010 | Gong et al. |
| 2015/0173120 A1 | 6/2015 | Yamada |
| 2016/0157265 A1* | 6/2016 | Lee .................. H04W 72/1284 370/329 |

OTHER PUBLICATIONS

R2-134219, "Signal Procedure for Dual-Connectivity"; Apr. 11th-15th, 2013 (Year: 2013).*

R2-131327; "User Plane Architecture for Dual-Connectivity"; Apr. 15-19, 2013.

R2-134219; "Signalling Procedures for Dual Connectivity"; Apr. 11-15, 2013.

CATT, "Discussion on Xn Interface functions," #GPP TSG RAN WG3#82, R3-132035, San Francisco, CA, Nov. 11-15, 2013, 4 pages.

JP Office Action dated Jan. 10, 2017 from corresponding JP Appl No. 2015-554950, 4 pp.

3rd Generation Partnership Project; Technical Specification Group Radio Access Network; Evolved Universal Terrestrial Radio Access (E-UTRA); "Study on Small Cell Enhancements for E-UTRA and E-UTRAN—Higher layer aspects;" 3GPP TR 36.842; V0.4.2; Nov. 2013; pp. 2-39; Release 12; 3GPP Organizational Partners.

An Office Action issued by the Japanese Patent Office dated Aug. 16, 2016, which corresponds to Japanese Patent Application No. 2015-554950 and is related to U.S. Appl. No. 15/085,642; with English language statement of relevance of non-English references.

3rd Generation Partnership Project; Technical Specification Group-Radio Access Network WG2 #84; "Signalling procedures for dual connectivity;" 3GPP Tdoc R2-134219; Nov. 2013; pp. 1-9; 3GPP Organizational Partners; San Francisco.

International Search Report issued in PCT/JP2014/084124; dated Mar. 3, 2015.

Written Opinion issued in PCT/JP2014/084124; dated Mar. 3, 2015.

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects; 3GPP TR 36.842; V1.0.0; Nov. 2013; pp. 1-68; Release 12; 3GPP Organizational Partners.

NTT Docomo, Inc.; Discussion on U-plane architecture for dual connectivity; 3GPP TSG-RAN WG2 #81; R2-130324; Jan. 28-Feb. 1, 2013; pp. 1-6; St. Julian's, Malta.

Intel Corporation; Scenarios and benefits of dual connectivity; 3GPP TSG RAN WG2 Meeting #81; R2-130570; Jan. 28-Feb. 1, 2013; pp. 1-7; St. Julian's, Malta.

InterDigital Communications; User Plane Architecture for Dual-Connectivity; 3GPP TSG-RAN WG2 #81bis; R2-131327; Apr. 15-19, 2013; pp. 1-7; Chicago, USA.

* cited by examiner

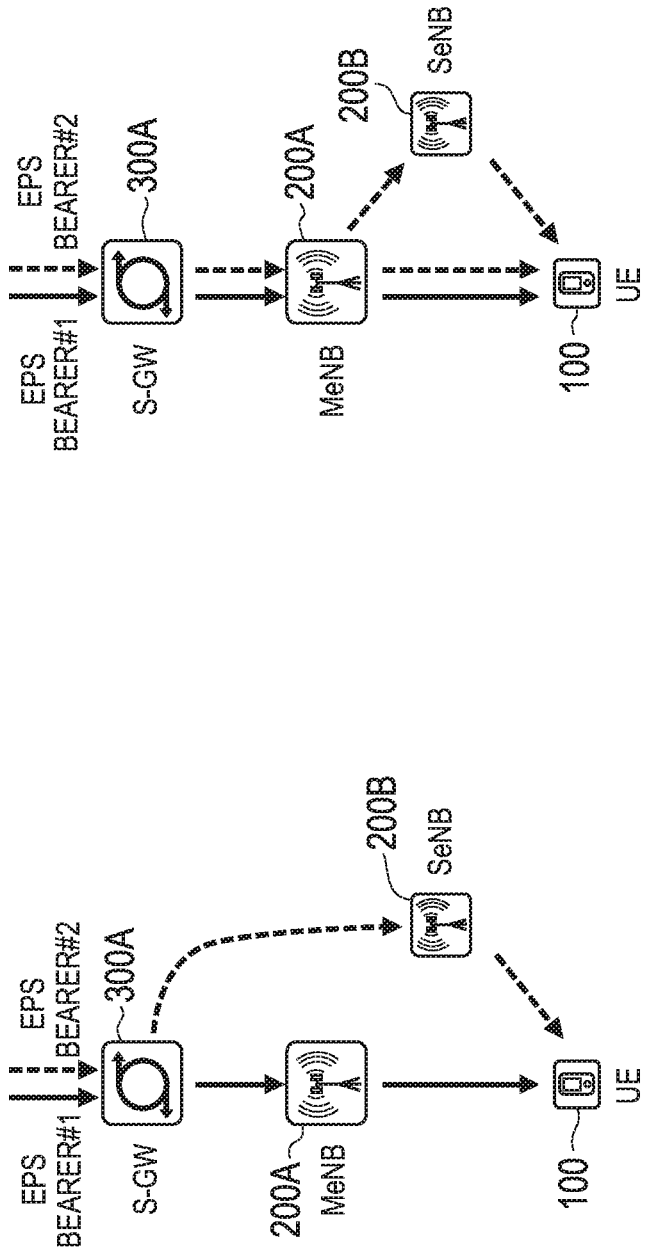

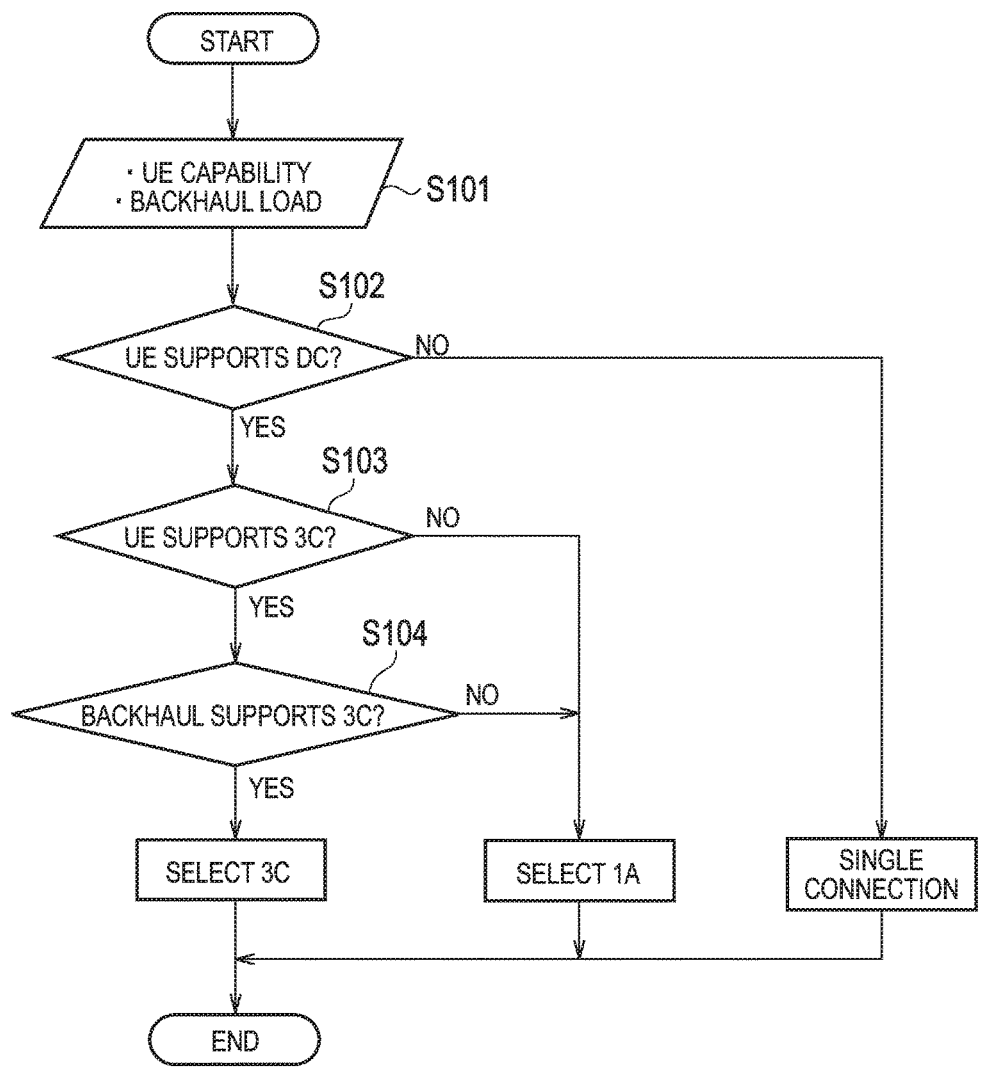

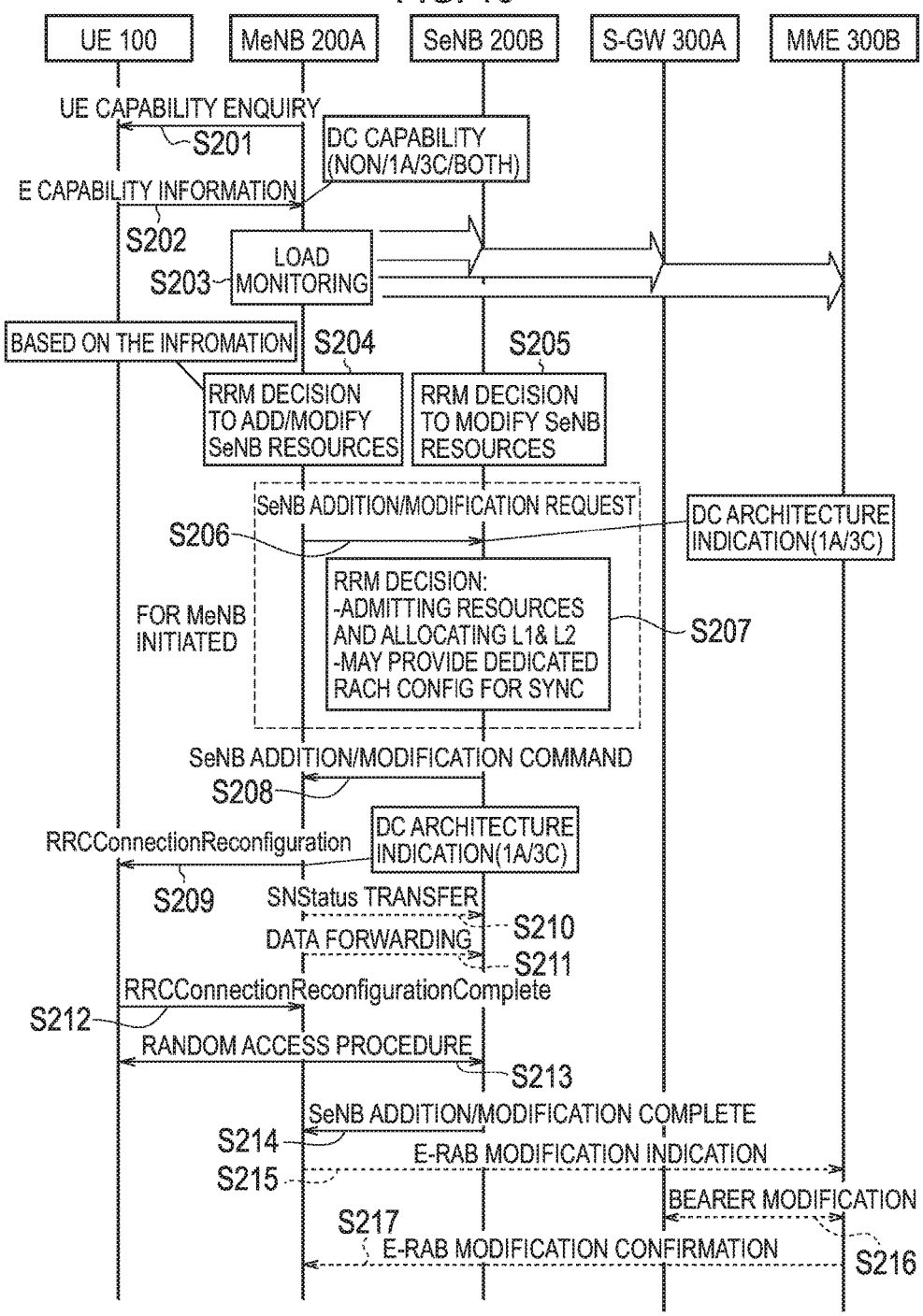

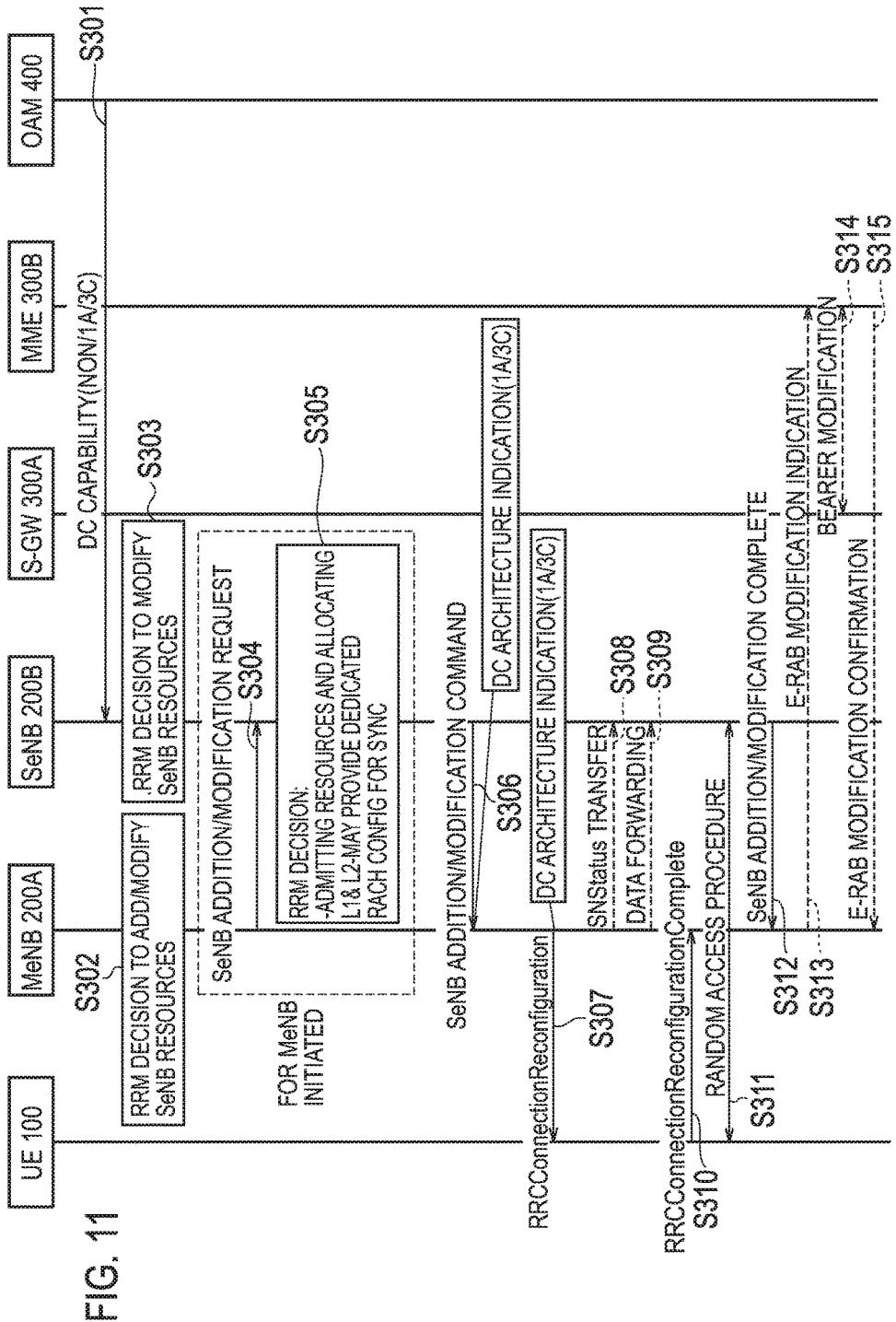

MOBILE COMMUNICATION SYSTEM, CONTROL APPARATUS, BASE STATION, AND USER TERMINAL SUPPORTING DUAL CONNECTIVITY

CROSS-REFERENCE TO RELATED APPLICATIONS

This application is a Continuation of U.S. application Ser. No. 15/085,642 filed Mar. 30, 2016, which is a Continuation of International Application No. PCT/JP2014/084124 filed Dec. 24, 2014, which claims benefit of Japanese Patent Application No. 2013-266179 filed Dec. 24, 2013 and U.S. Provisional Application No. 61/934,424 filed Jan. 31, 2014, the entirety of all applications hereby expressly incorporated by reference.

TECHNICAL FIELD

The present disclosure relates to a mobile communication system that supports dual connectivity scheme.

BACKGROUND ART

In the 3GPP (3rd Generation Partnership Project), which is a standardization project of mobile communication systems, introduction of a user data transmission system using dual connectivity scheme has been examined. In this transmission system, connection is established between each of a plurality of base stations and user terminal, by which a plurality of data paths used for the transfer of user data are established.

In particular, examples of the data path established in dual connectivity include: a data path established between a core network and user equipment via one base station; and a data path established between a core network and user equipment, branching at one base station, one branched path thereof being established via another base station, and the other branched path thereof being established not via another base station. These data paths may be referred to as bearers.

A plurality of user plane architectures with different combinations of these data paths are proposed (see Non Patent Document 1).

CITATION LIST

Non-Patent Document

Non Patent Document 1: 3GPP Technical Report "TR 36.842 V1.0.0" November, 2013

SUMMARY

A first base station according to the present disclosure comprises a controller configured to directly receive capability information from a user terminal. The capability information indicates whether the user terminal supports a first architecture in which a SCG (Secondary Cell Group) bearer is used and whether the user terminal supports a second architecture in which a split bearer is used. The SCG bearer is a bearer which goes via both a serving gate way and a second base station without going via the first base station, and the split bearer is a bearer which goes via both the serving gate way and the first base station, and is split in a PDCP (Packet Data Convergence Protocol) layer of the first base station. One split path of the split bearer goes via the second base station, and another split path of the split bearer does not go via the second base station and goes via the first base station. The controller is configured to configure either the SCG bearer or the split bearer to a user terminal without simultaneously configuring both the SCG bearer and the split bearer even when the user terminal has indicated that it supports both the first architecture and the second architecture.

A control method according to the present disclosure comprises directly transmitting, by a user terminal, capability information to a first base station, wherein the capability information indicates whether the user terminal supports a first architecture in which a SCG (Secondary Cell Group) bearer is used and whether the user terminal supports a second architecture in which a split bearer is used, and directly receiving, by the first base station, the capability information from the user terminal. The SCG bearer is a bearer which goes via both a serving gate way and a second base station without going via the first base station, and the split bearer is a bearer which goes via both the serving gate way and the first base station and is split in a PDCP (Packet Data Convergence Protocol) layer of the first base station. One split path of the split bearer goes via the second base station, and another split path of the split bearer does not go via the second base station and goes via the first base station. The control method further comprises configuring, by the first base station, either the SCG bearer or the split bearer to a user terminal without simultaneously configuring both the SCG bearer and the split bearer even when the user terminal has indicated that it supports both the first architecture and the second architecture.

BRIEF DESCRIPTION OF THE DRAWINGS

FIGS. 5A and 5B are diagrams (first) illustrating a data path established in a user plane architecture according to an embodiment.
FIG. 9 is a flowchart illustrating selection of a user plane architecture according to an embodiment.
FIG. 10 is a sequence diagram illustrating an operation sequence 1 according to an embodiment.
FIG. 11 is a sequence diagram illustrating an operation sequence 2 according to an embodiment.

DESCRIPTION OF THE EMBODIMENT

[Overview of Embodiment]

Figure 1:
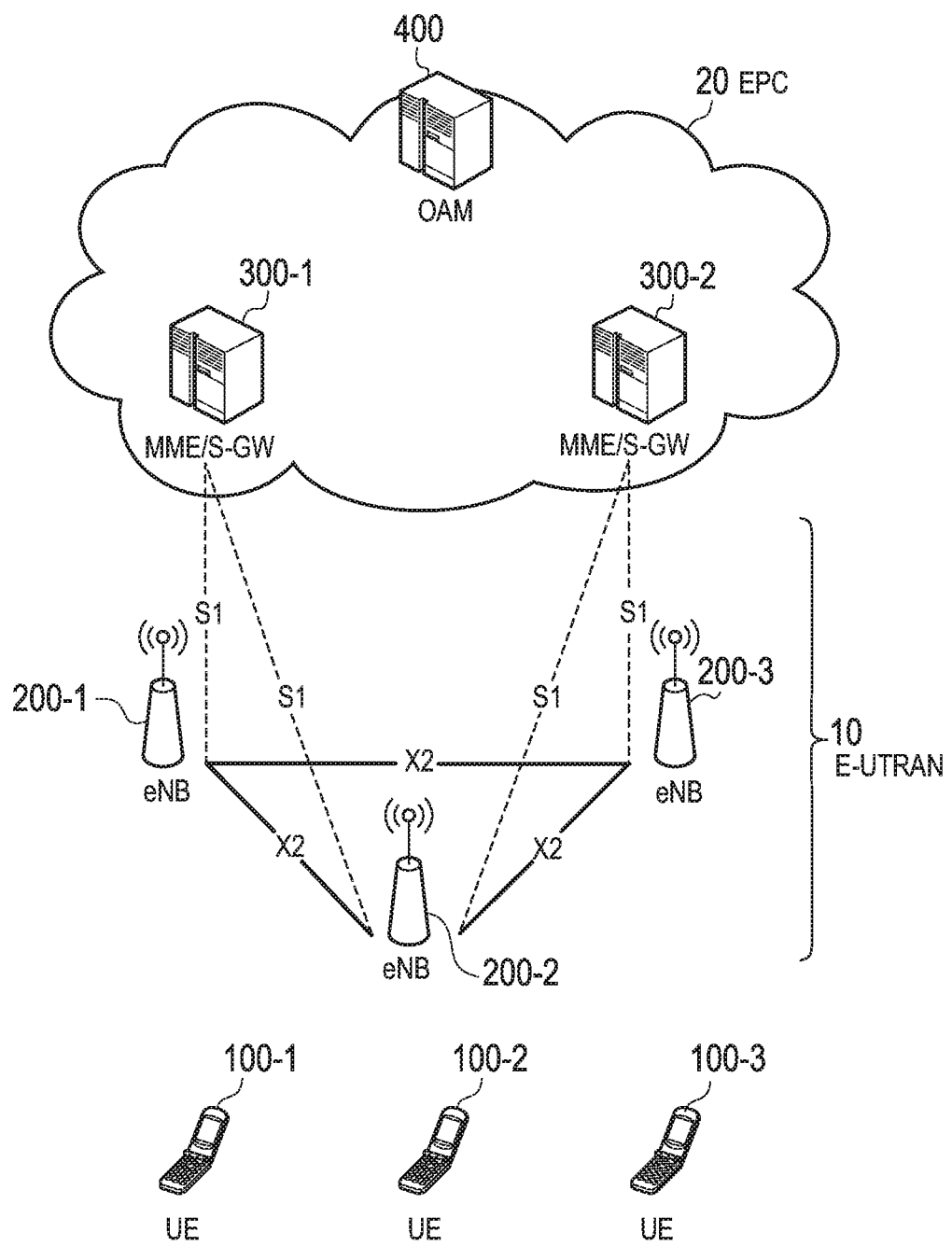
FIG. 1 is a configuration diagram of an LTE system.

In the current specification, there is no framework in which the dual connectivity scheme is appropriately controlled when a plurality of user plane architectures are available.

A master base station according to an embodiment comprises: a controller configured to notify a secondary base station of information for indicating whether a user plane architecture in dual connectivity is an architecture in which a SCG (Secondary Cell Group) bearer is used or an architecture in which a split bearer is used. The SCG bearer is a bearer which goes via both a serving gate way and the secondary base station without going via the master base station. The split bearer is a bearer which goes via both the serving gate way and the master base station, and which is split in a PDCP (Packet Data Convergence Protocol) layer of the master base station. One split path of the split bearer goes via the secondary base station, and another split path of the split bearer does not goes via the secondary base station.

The controller may transmit a SeNB (Secondary evolved Node-B) addition request message including the information to the secondary base station. The SeNB addition request message may be a message for requesting an allocation of a radio resource to a user terminal.

The controller may receive a response to the SeNB addition request message from the secondary base station. The response may include information on a new radio resource.

The controller may receive a response to the SeNB addition request message from the secondary base station. The response may include information indicating that the user plane architecture provided by the master base station can be accepted in the secondary base station.

The controller may transmit a SeNB (Secondary evolved Node-B) modification request message including the information to the secondary base station. The SeNB modification request message may be a message for requesting a modification of an allocation of a radio resource to a user terminal.

The controller may transmit a RRC (Radio Resource Control) connection reestablishment message to a user terminal. The RRC connection reestablishment message may include information for indicating whether the user plane architecture in dual connectivity is the architecture in which the SCG bearer is used or the architecture in which the split bearer is used.

The controller may configure either the SCG bearer or the split bearer to the user terminal without simultaneously configuring both the SCG bearer and the split bearer.

The controller may receive capability information from a user terminal, the capability information including information on a user plane architecture which the user terminal supports in the dual connectivity.

A user terminal according to an embodiment comprises: a receiver configured to receive information from a master base station, the information for indicating whether a user plane architecture in dual connectivity is an architecture in which a SCG (Secondary Cell Group) bearer is used or an architecture in which a split bearer is used. The SCG bearer is a bearer which goes via both a serving gate way and a secondary base station without going via the master base station. The split bearer is a bearer which goes via both the serving gate way and the master base station and which is split in a PDCP (Packet Data Convergence Protocol) layer of the master base station. One split path of the split bearer goes via the secondary base station, and another split path of the split bearer does not goes via the secondary base station.

Either the SCG bearer or the split bearer may be configured to the user terminal without simultaneously configuring both the SCG bearer and the split bearer.

The user terminal may be configured to transmit capability information to the master base station, the capability information including information on a user plane architecture which the user terminal supports in the dual connectivity.

A secondary base station according to an embodiment comprises: a controller configured to receive, from a master base station, information for indicating whether a user plane architecture in dual connectivity is an architecture in which a SCG (Secondary Cell Group) bearer is used or an architecture in which a split bearer is used. The SCG bearer is a bearer which goes via both a serving gate way and the secondary base station without going via the master base station. The split bearer is a bearer which goes via both the serving gate way and the master base station and which is split in a PDCP (Packet Data Convergence Protocol) layer of the master base station. One split path of the split bearer goes via the secondary base station, and another split path of the split bearer does not goes via the secondary base station.

The controller may receive a SeNB (Secondary evolved Node-B) addition request message including the information from the master base station. The SeNB addition request message may be a message for requesting an allocation of a radio resource to a user terminal.

The controller may transmit a response to the SeNB addition request message to the master base station. The response may include information on a new radio resource.

The controller may transmit a response to the SeNB addition request message to the master base station. The response may include information indicating that the user plane architecture provided by the master base station can be accepted in the secondary base station.

The controller may receive a SeNB (Secondary evolved Node-B) modification request message including the information form the master base station. The SeNB modification request message may be a message for requesting a modification of an allocation of a radio resource to a user terminal.

Embodiment

Hereinafter, the embodiment will be described.

(LTE System)

FIG. 1 is a configuration diagram of an LTE system according to a present embodiment.

As shown in FIG. 1, the LTE system includes a plurality of UEs (User Equipments) {100-1, 100-2, 100-3}(generally/collectively "UE 100"), E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs (evolved Node-Bs) {200-1, 200-2, 200-3} (generally/collectively "eNB 200"). Each eNB 200 corresponds to a base station. Each eNB 200 manages a cell and performs radio communication with the UE 100 that establishes a connection with the cell. In addition, the eNBs {200-1, 200-2, 200-3} collectively include a MeNB (Master eNB) 200A and a SeNB (Slave eNB or Secondary eNB) 200B. While not specifically pictured in FIG. 1, the MeNB 200A and the SeNB 200B can be any of eNBs {200-1, 200-2, 200-3} and are discussed in detail with respect to FIGS. 5A-6B.

The MeNB 200A has a radio resource management function (RRC Entity) for the UE 100, and the SeNB 200B does not have a radio resource management function for the UE 100. In addition, the MeNB 200A may manage a macro cell. On the other hand, the SeNB 200B may manage a small cell (pico cell/femto cell) having a smaller coverage than that of the macro cell and be installed in the cell managed by the MeNB 200A. The SeNB 200B may be a home eNB. The SeNB 200B may not manage mobility of the UE 100 applied to a dual connectivity scheme.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GW (Serving-Gateway) 300 and OAM 400 (Operation and Maintenance). Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, configurations of the UE 100 and the eNB 200 will be described.

Figure 2:
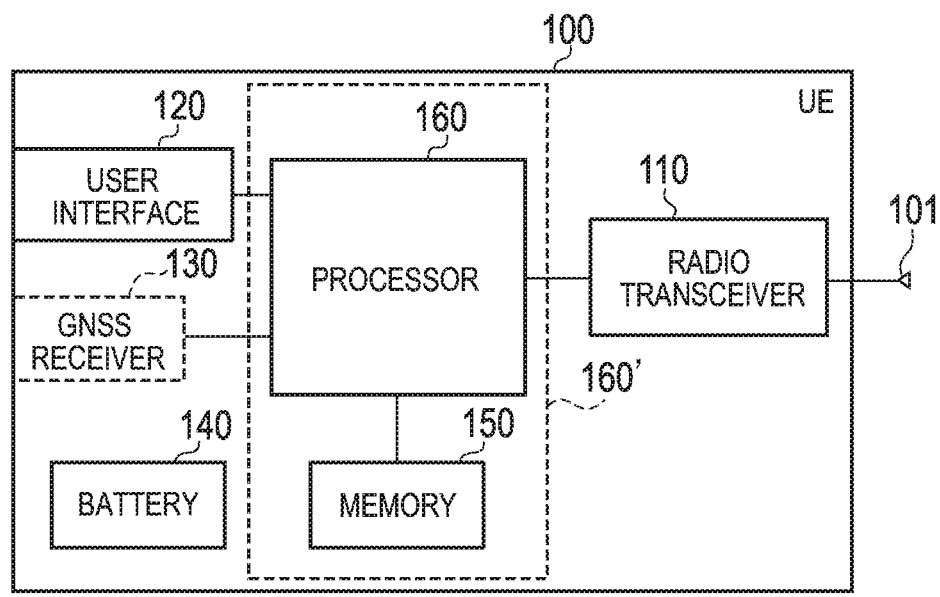
FIG. 2 is a block diagram of UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 and the processor 160 configure a controller.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
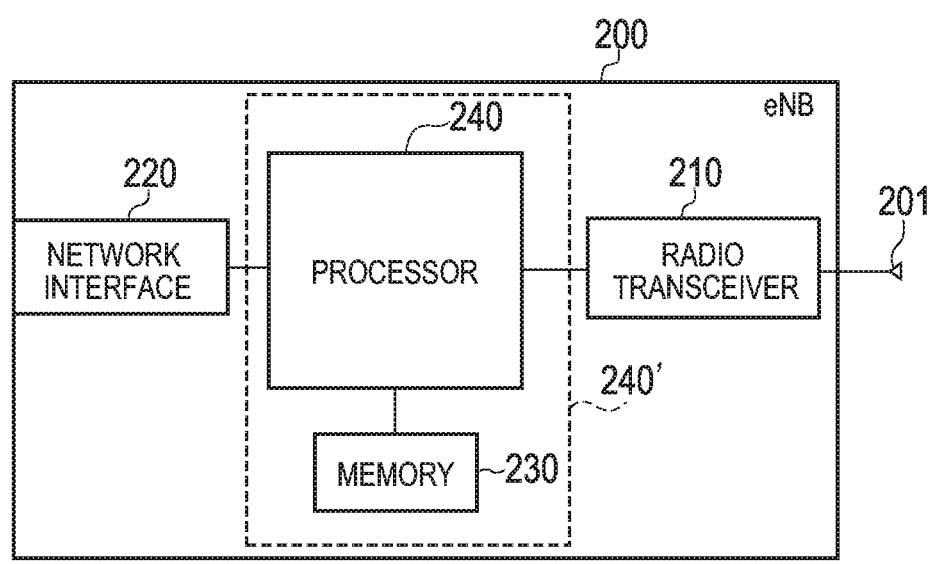
FIG. 3 is a block diagram of an eNB.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 constitute a controller. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
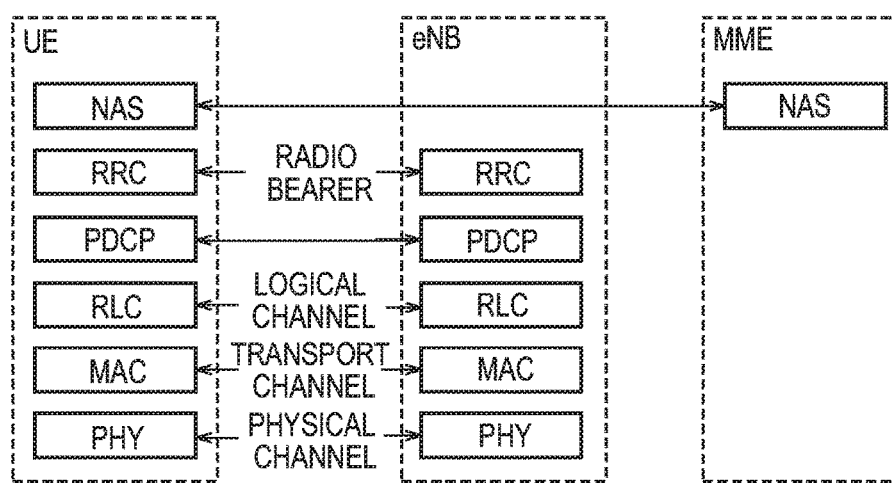
FIG. 4 is a protocol stack diagram of a wireless interface in the LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes MAC (Media Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a MAC scheduler to decide a transport format of an uplink and a downlink (a transport block size, a modulation and coding scheme and the like) and a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state (a RRC connected state), and when the RRC connection is not established, the UE 100 is in an idle state (a RRC idle state).

NAS (Non-Access Stratum) layer positioned above the RRC layer performs session management, mobility management and the like.

(User Plane Architecture)

Figure 6A:
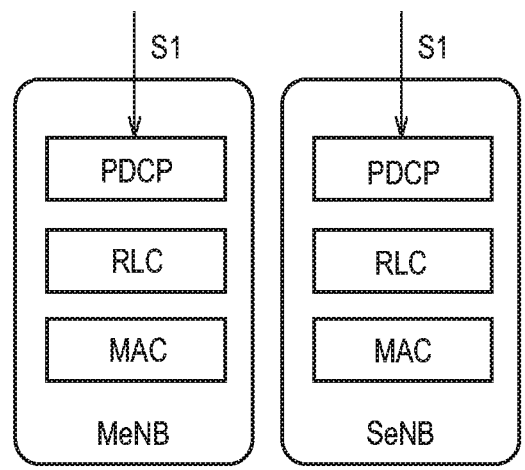
FIGS. 6A and 6B are diagrams (second) illustrating a data path established in a user plane architecture according to an embodiment.
Figure 6B:
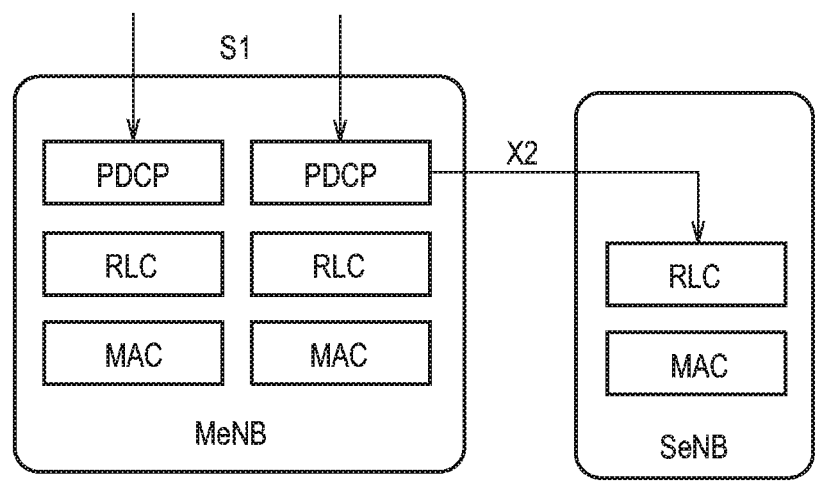

Next, a user plane architecture according to an embodiment is described with reference to FIGS. 5A and 5B and FIGS. 6A and 6B. FIGS. 5A and 5B are diagrams (first) illustrating a data path established in a user plane architecture according to an embodiment. FIGS. 6A and 6B are diagrams (second) illustrating a data path established in a user plane architecture according to an embodiment. FIGS. 5A and 6A are diagrams each illustrating a data path established in a first user plane architecture (1A), and FIGS. 5B and 6B are diagrams each illustrating a data path established in a second user plane architecture (3C).

As illustrated in FIGS. 5A and 5B, the UE 100 is applied to the dual connectivity scheme, and establishes a connection with the MeNB 200A and with the SeNB 200B. In particular, the UE 100 establishes the RRC connection with the MeNB 200A, and establishes a radio bearer used for transmission and reception of user data without establishing an RRC connection with the SeNB 200B. Therefore, the UE 100 can establish a data path that goes via the MeNB 200A (hereafter, referred to as a first data path) and a data path that may go via the SeNB 200B (hereafter, referred to as a second data path) between a core network and the UE 100. A plurality of such user plane architectures with different combinations of data paths are described hereinafter. Note that the data path may be referred to as an EPS bearer.

In a first user plane architecture (hereafter, referred to as a UP1A architecture), as illustrated in FIG. 5A, a first data path (EPS bearer#1: the solid line) goes via the MeNB 200A. In particular, the first data path goes via an S-GW 300A and the MeNB 200A. On the other hand, a second data path (EPS bearer#2: the dotted line) goes via the SeNB 200B without going via the MeNB 200A. In particular, the second data path goes via an S-GW 300A and the SeNB 200B. Therefore, in the second data path, an S1-U that is a reference point (RP) between an E-UTRAN 10 and the S-GW 300A terminates at the SeNB 200B. The second data path is not branched. It is noted that the data path relating to the first user plane architecture may be often referred to as SCG bearer.

In a second user plane architecture (hereafter, a UP3C architecture), as illustrated in FIG. 5B, the first data path (EPS bearer#1: the solid line) is the same as that of the UP1A architecture. On the other hand, the second data path (EPS bearer#2: the dotted line) branches in the MeNB 200A. One branched path goes via the SeNB 200B. The other branched path does not go via the SeNB 200B. Therefore, in the second data path, the S1-U terminates at the MeNB 200A. The second data path is branched at the E-UTRAN 10. It is noted that the data path relating to the second user plane architecture may be often referred to as split bearer.

In the UP1A architecture, as illustrated in FIG. 6A, the first data path goes via a PDCP layer in the MeNB 200A, and the second data path goes via a PDCP layer in the SeNB 200B. Therefore, the PDCP layer via which the first data path goes and the PDCP layer via which the second data path goes exist in different eNBs 200, and these PDCP layers are independent from each other. Note that the first data path goes via the RLC layer in the MeNB 200A and the second data path goes via the RLC layer in the SeNB 200B.

On the other hand, in the UP3C architecture, as illustrated in FIG. 6B, the first data path and the second data path each goes via the PDCP layer in the MeNB 200A and the second data path does not go via the PDCP layer in the SeNB 200B. The first data path goes via the RLC layer in the MeNB 200A. On the other hand, the second data path goes via an X2 interface and via the RLC layer in the SeNB 200B, so does not go via the RLC layer in the MeNB 200A. Therefore, the PDCP layer via which the first data path goes and the PDCP layer via which the second data path goes exist in the same eNB 200 (i.e., the MeNB 200A). The RLC layer via which the first data path goes and the RLC layer via which the second data path goes exist in different eNBs 200, and these RLC layers are independent from each other. Therefore, in the second data path, the S1-U terminates at the MeNB 200A.

If the second data path is used, a pattern in which only the MeNB 200A transmits and receives user data with the UE 100, a pattern in which only the SeNB 200B transmits and receives user data with the UE 100, and a pattern in which each of the MeNB 200A and the SeNB 200B transmits and receives user data with the UE 100 are used suitably.

As a feature of the UP3C architecture, in comparison with the UP1A, since the second data path goes via the MeNB 200A, flexible resource allocation is possible. In particular, regarding the transfer of the user data based on the second data path, either of a radio resource managed by the MeNB 200A or a radio resource managed by the SeNB 200B, or both of these radio resources can be used. Therefore, throughput of the user data can be increased.

In the UP3C architecture, since the S1-U terminates at the MeNB 200A, mobility of the SeNB 200B can be concealed with respect to the core network.

In a downlink, if each of the MeNB 200A and the SeNB 200B transmits the user data (in particular, user data units or packets) to the UE 100 on the second data path, the UE 100 needs to perform re-ordering of received signals of the user data units directly received from the MeNB 200A, and re-ordering of received signals of the user data units received from the SeNB 200B. Re-ordering means re-arranging user data units in a right order in order to restore the user data (packets). Similarly in an uplink, if the UE 100 transmits the user data in a divided manner on the second data path, the MeNB 200A needs to perform re-ordering of received signals of the user data directly received from the UE 100, and re-ordering of the received signals of the user data received from the UE 100 via the SeNB 200B. Therefore, each of the UE 100 and the MeNB 200A requires a buffer used for the re-ordering.

On the other hand, as a feature of the UP1A architecture, when compared with the UP3C, since no user data is transferred from the MeNB 200A to the SeNB 200B, processing load on the MeNB 200A is not increased. Further, since no traffic is generated in a backhaul link used for the transfer of the user data from the MeNB 200A to the SeNB 200B, traffic does not increase. Each of the UE 100 and the MeNB 200A does not need a buffer for the re-ordering.

(Operation According to Embodiment)

Hereinafter, an operation according to an embodiment is described.

(1) Summary of Operation

Figure 7A:
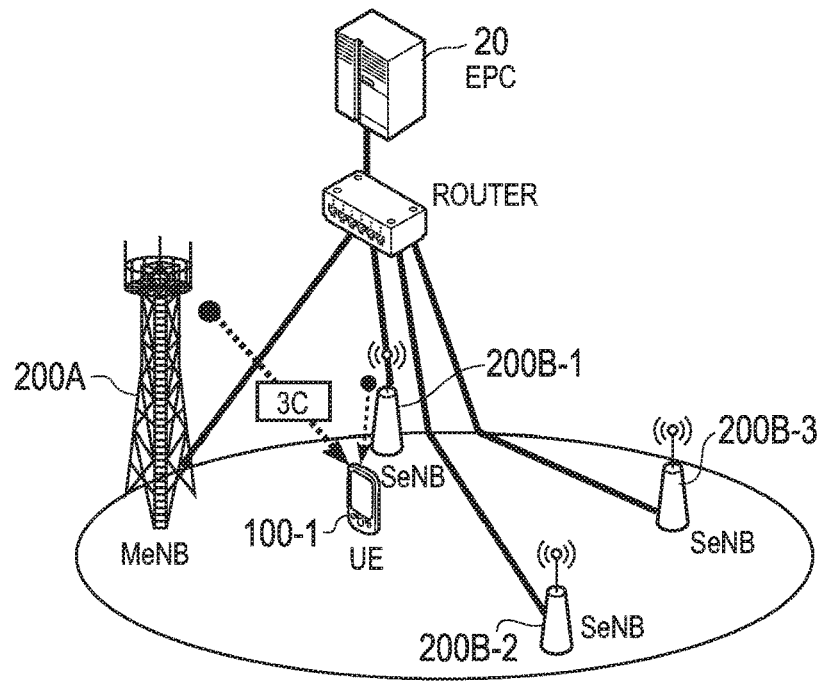
FIGS. 7A and 7B are diagrams illustrating a summary of an operation according to the present embodiment.
Figure 7B:
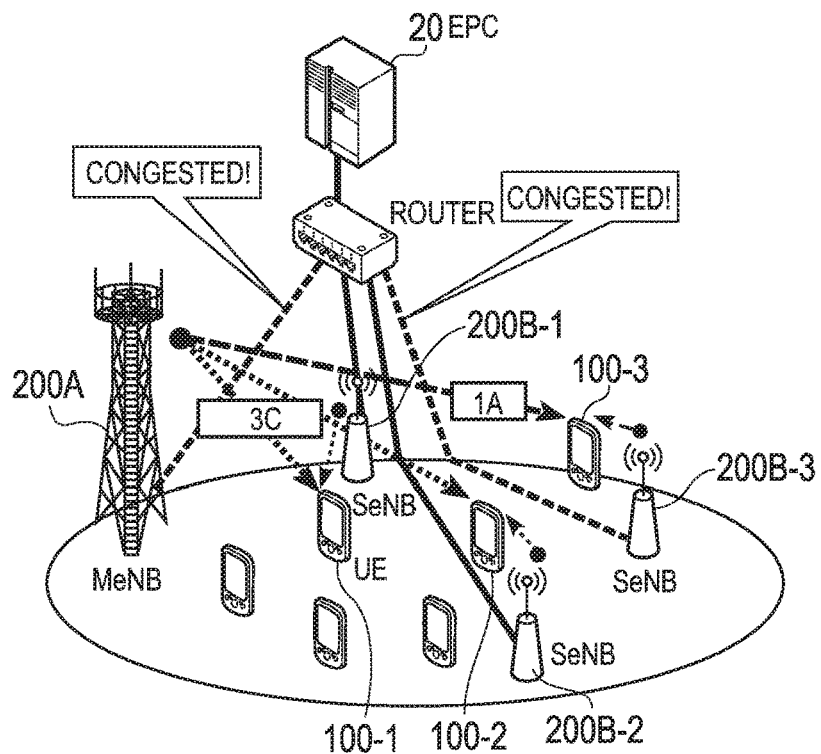
Figure 8:
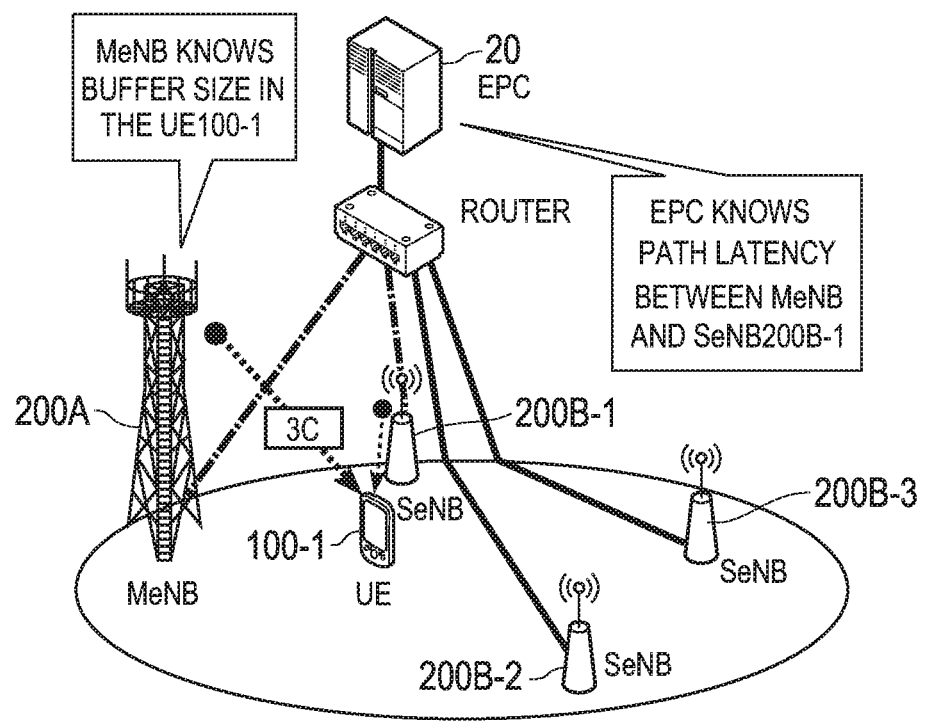
FIG. 8 is a diagram illustrating a summary of an operation according to the present embodiment.

A summary of the operation according to an embodiment is described with reference to FIGS. 7A and 7B and FIG. 8. FIGS. 7A and 7B and FIG. 8 are diagrams illustrating the summary of the operation according to the present embodiment.

As illustrated in FIGS. 7A and 7B, the mobile communication system according to the present embodiment is provided with the EPC 20, a router, a plurality of UEs 100 (UE 100-1, UE 100-2, and UE 100-3), the MeNB 200A, and a plurality of SeNBs 200B (an SeNB 200B-1, an SeNB 200B-2, and an SeNB 200B-3).

The EPC 20 is connected to the MeNB 200A and each of a plurality of SeNBs 200B via the router. The MeNB 200A is connected to each of a plurality of SeNBs 200B via the router. A plurality of SeNBs 200B are installed in a cell managed by the MeNB 200A.

In the present embodiment, a control apparatus that selects a user plane architecture (namely, data bearer) applied to the UE 100 is provided in the MeNB 200A. Therefore, the MeNB 200A selects a user plane architecture applied to the UE 100 from among a plurality of user plane architectures on the basis of the situation of the network and/or the situation of the UE 100.

Here, the situation of the network includes at least one of the following: load on the MeNB 200A; a communication situation between the MeNB 200A and the SeNB 200B (i.e., communication delay time between the MeNB 200A and the SeNB 200B, and transmission speed between the MeNB 200A and the SeNB 200B); capability of the MeNB 200A and capability of the SeNB 200B; and capability of the backhaul link between the MeNB 200A and the SeNB 200B. Note that the situation of the network may also include the situation of communication between the MeNB 200A and the MME/S-GW 300, load on the EPC 20 (in particular, MME/S-GW 300), load on the SeNB 200B, and the load on the router.

In particular, load on the MeNB 200A is hardware load on the MeNB 200A. Communication delay time (i.e., latency) between the MeNB 200A and the SeNB 200B is (dynamic) delay time that varies depending on a situation of traffic or other factors.

Transmission speed (i.e., capacity) between the MeNB 200A and the SeNB 200B is (dynamic) transmission speed that varies depending on a situation of traffic or other factors. Alternatively, transmission speed (i.e., capacity) between the MeNB 200A and the SeNB 200B may be tolerance of transmission speed.

Capability of the MeNB 200A and capability of the SeNB 200B are throughput of the eNB 200 and are, for example, arithmetic processing capability about re-ordering of the received signals of the user data, throughput of the PDCP layer related to the second data path, and buffer capacity for the user data (especially buffer capacity used for the re-ordering of the received signals of the user data). Buffer capacity (buffer size) may be inherent buffer capacity depending on memory 230, and may be a buffer utilization rate (or tolerance of buffer capacity) at the time of selecting user plane architecture. The buffer may be dedicated for the re-ordering for the second data path.

Capability of the backhaul link connected to the MeNB 200A and to the SeNB 200B is fixed capability depending on, for example, the type of the backhaul link (e.g., an optical line and an ADSL line), and the line design (e.g., topology), and independent of the situation of communication.

The situation of the UE 100 includes capability of the UE 100. Capability of the UE 100 may be determined on the basis of at least one of arithmetic processing capability about re-ordering of the received signals of the user data, and buffer capacity for the user data. Capability of the UE 100 includes application capability of the user plane architecture. The situation of the UE 100 may also include a communication environment of the UE 100 (i.e., a communication environment between the UE 100 and the MeNB 200A, and/or a communication environment between the UE 100 and the SeNB 200B-2), and a situation of movement of the UE 100.

Arithmetic processing capability about the re-ordering of the received signals of the user data may be the throughput of the CPU of the UE 100. Buffer capacity of the user data may be inherent buffer capacity depending on the memory 150, buffer capacity dedicated for the re-ordering for the second data path, or a buffer utilization rate at the time of selecting the user plane architecture (or tolerance of buffer capacity). The arithmetic processing capability may also be throughput of a chip set including these arithmetic processing capability and capability about the buffer. The UE 100 has application capability of the UP3C architecture when, for example, the UE 100 supports the UP3C architecture.

The MeNB 200A can select a user plane architecture applied to the UE 100 by at least one of the following methods. Note that the MeNB 200A may select a user plane architecture applied to the UE 100 by combining a plurality of these methods.

As a first method, the MeNB 200A can select a user plane architecture applied to the UE 100 by comparing load on the MeNB 200A with a predetermined threshold. In particular, the MeNB 200A selects the UP1A architecture if load on the MeNB 200A is high. The MeNB 200A selects the UP3C architecture if load on the MeNB 200A is low. Therefore, the MeNB 200A can suitably select the UP3C architecture with high throughput while load on the MeNB 200A is large compared with the UP1A architecture.

As a second method, the MeNB 200A can select a user plane architecture applied to the UE 100 by comparing communication delay time between the MeNB 200A and the SeNB 200B with a predetermined threshold. In particular, the MeNB 200A selects the UP1A architecture if communication delay time between the MeNB 200A and the SeNB 200B is long. The MeNB 200A selects the UP3C architecture if communication delay time between the MeNB 200A and the SeNB 200B is short. Therefore, the MeNB 200A can suitably select the UP3C architecture with high throughput while hardware load on the MeNB 200A and on the UE 100 is large compared with the UP1A architecture.

As a third method, the MeNB 200A can select a user plane architecture applied to the UE 100 by comparing transmission speed between the MeNB 200A and the SeNB 200B with a predetermined threshold. In particular, the MeNB 200A selects the UP1A architecture if the transmission speed between the MeNB 200A and the SeNB 200B is low. The MeNB 200A selects the UP3C architecture if the transmission speed between the MeNB 200A and the SeNB 200B is high. Therefore, the MeNB 200A can suitably select the UP3C architecture with high throughput while backhaul load becomes large compared with the UP1A architecture.

As a fourth method, the MeNB 200A can select a user plane architecture applied to the UE 100 by comparing capability of the MeNB 200A and capability of the SeNB 200B with a threshold. In particular, the MeNB 200A selects the UP1A architecture if capability of the MeNB 200A (e.g., buffer capacity) is low. The MeNB 200A selects the UP3C architecture if capability of the MeNB 200A is high. The MeNB 200A selects the UP1A architecture if capability of the SeNB 200B is high. The MeNB 200A selects the UP1A architecture if capability of the SeNB 200B is low. Therefore, the MeNB 200A can suitably select the UP3C architecture with high throughput while a buffer for the re-ordering is required compared with the UP1A architecture.

As a fifth method, the MeNB 200A can select the user plane architecture applied to the UE 100 by comparing capability of the backhaul link between the MeNB 200A and the SeNB 200B with a threshold. In particular, the MeNB 200A selects the UP1A architecture if capability of the backhaul link between the MeNB 200A and the SeNB 200B is low. The MeNB 200A selects the UP3C architecture if capability of the backhaul link between the MeNB 200A and the SeNB 200B is high. Therefore, the MeNB 200A can suitably select the UP3C architecture with high throughput while there is a possibility that communication delay is caused compared with the UP1A architecture.

As a sixth method, the MeNB 200A can select a user plane architecture applied to the UE 100 by comparing arithmetic processing capability of the UE 100 about the re-ordering of the received signals of the user data with a predetermined threshold. In particular, the MeNB 200A selects the UP1A architecture if the arithmetic capability of the UE 100 is low. The MeNB 200A selects the UP3C architecture if the arithmetic capability of the UE 100 is high. Therefore, the MeNB 200A can suitably select a UP3C architecture with high throughput while load on the UE 100 is large compared with the UP1A architecture.

As a seventh method, the MeNB 200A can select a user plane architecture applied to the UE 100 by comparing buffer capacity of the UE 100 with a predetermined threshold. In particular, the MeNB 200A selects the UP1A architecture if buffer capacity (especially buffer capacity used for the re-ordering) of the UE 100 is small. The MeNB 200A selects the UP3C architecture if buffer capacity of the UE 100 is large. Therefore, the MeNB 200A can suitably select the UP3C architecture with high throughput while the UE 100 requires a buffer for the re-ordering compared with the UP1A architecture.

As an eighth method, the MeNB 200A can select a user plane architecture applied to the UE 100 on the basis of application capability of the user plane architecture of the UE 100. In particular, the MeNB 200A selects either of the UP1A architecture or the UP3C architecture if the UE 100 supports application of the UP1A architecture and the UP3C architecture. If the UE 100 supports application of either the UP1A architecture or the UP3C architecture, the MeNB 200A selects the supported user plane architecture. If the UE 100 does not support application of the UP1A architecture and the UP3C architecture (i.e., if the UE 100 does not support the dual connectivity scheme), the MeNB 200A selects a user plane architecture that employs a single connectivity method instead of the dual connectivity scheme.

The MeNB 200A can suitably select the UP1A architecture and the UP3C architecture from among a plurality of user plane architectures using at least one of the above methods.

For example, in FIG. 7A, the number of UEs 100 connected to the eNB 200 (i.e., the MeNB 200A and the SeNB 200B) is small (see FIG. 7B). Since the MeNB 200A has a small traffic volume in the network and the situation of communication between the MeNB 200A and the SeNB 200B is favorable, the MeNB 200A selects the UP3C architecture for the UE 100 existing in a cell of the SeNB 200B-1 (and in a cell of the MeNB 200A). Therefore, the UE 100-1 transmits and receives user data with the MeNB 200A and with the SeNB 200B-1 based on the UP3C architecture.

On the other hand, in FIG. 7B, the number of UEs 100 connected to the eNB 200 is large. Therefore, the backhaul link is congested. For example, it is assumed that the backhaul link between the MeNB 200A and the SeNB 200B-3 via the router is congested. If the MeNB 200A detects congestion of the backhaul link between the MeNB 200A and the SeNB 200B-3 (i.e., a decrease in transmission speed/an increase in communication delay time), the MeNB 200A selects the UP1A architecture for the UE 100-3 located in a cell of the SeNB 200B-3 (and in the cell of the MeNB 200A). Therefore, the UE 100-3 transmits and receives user data with the MeNB 200A and with the SeNB 200B-3 based on the UP1A architecture.

Since the MeNB 200A does not detect congestion of the backhaul link between the MeNB 200A and the SeNB 200B-2, the MeNB 200A selects the UP3C architecture for the UE 100-2 located in a cell of the SeNB 200B-2 (and in the cell of the MeNB 200A). In this manner, the MeNB 200A selects a user plane architecture to each of a plurality of UEs 100.

Since buffer capacity of the MeNB 200A necessary for storing the user data to be re-ordered becomes larger in proportion to the communication delay time, the user plane architecture applied to the UE 100 may be selected from among a plurality of user plane architectures on the basis of the communication delay time and the buffer capacity (the buffer size).

For example, as illustrated in FIG. 8, the EPC 20 knows the communication delay time between the MeNB 200A and each SeNB 200B by a report from each eNB 200. The EPC 20 that manages a DC list related to a combination of the MeNB 200A and a plurality of SeNBs 200B updates, on the basis of the report from each eNB 200, communication delay time between the MeNB 200A and each SeNB 200B registered in the DC list. Note that throughput between the MeNB 200A and each SeNB 200B may be registered in the DC list.

The EPC 20 provides information indicating the communication delay time to the MeNB 200A. The EPC 20 may provide the DC list to the MeNB 200A. The MeNB 200A knows the communication delay time between the MeNB 200A and the SeNB 200B-1 on the basis of the information indicating the communication delay time. The MeNB 200A knows the buffer capacity (the buffer size) of the UE 100-1 on the basis of a buffer situation report (BSR) from the UE 100-1.

Then, the MeNB 200A selects the user plane architecture applied to the UE 100-1 on the basis of the communication delay time and the buffer capacity (the buffer size) of the UE 100-1.

As illustrated in FIG. 9, the MeNB 200A may select a user plane architecture applied to the UE 100 from among a plurality of user plane architectures on the basis of capability of the UE 100 and backhaul load. Note that the backhaul load is determined depending on, for example, the communication delay time between the MeNB 200A and the SeNB 200B, and the transmission speed between the MeNB 200A and the SeNB 200B. Backhaul load may be the communication delay time or the transmission speed.

As illustrated in FIG. 9, in step S101, the MeNB 200A acquires UE capability information and backhaul load information.

In step S102, the MeNB 200A determines, on the basis of the UE capability information, whether the UE 100 supports dual connectivity (DC). If the MeNB 200A determines that the UE 100 does not support dual connectivity, the MeNB 200A selects the user plane architecture based on the single connection, and completes the process. On the other hand, if the MeNB 200A determines that the UE 100 supports dual connectivity, the MeNB 200A performs the process of step S103.

In step S103, the MeNB 200A determines whether the UE 100 supports the UP3C architecture. If the MeNB 200A determines that the UE 100 does not support the UP3C architecture, the MeNB 200A selects the UP1A architecture and completes the process. On the other hand, if the MeNB 200A determines that the UE 100 supports the UP3C architecture, the MeNB 200A performs the process of step S104.

In step S104, the MeNB 200A determines whether the backhaul supports the UP3C architecture. In particular, if the backhaul load is smaller than a threshold at which application of the UP3C architecture is permitted, the MeNB 200A determines that the backhaul does not support the UP3C architecture, and selects the UP1A architecture. On the other hand, if the backhaul load is equal to or greater than a threshold at which application of the UP3C architecture is permitted, the MeNB 200A determines that the backhaul supports the UP3C architecture, and selects the UP3C architecture.

(2) Operation Sequence

Next, operation sequences 1 and 2 according to an embodiment are described with reference to FIGS. 10 and 11. FIG. 10 is a sequence diagram illustrating the operation sequence 1 according to an embodiment. FIG. 11 is a sequence diagram illustrating the operation sequence 2 according to an embodiment.

(2.1) Operation Sequence 1

In the operation sequence 1, the UE 100 is connected to the MeNB 200A and not connected to the SeNB 200B. The control apparatus that selects the user plane architecture is provided in the MeNB 200A.

As illustrated in FIG. 10, in step S201, the MeNB 200A provides a UE capability enquiry message to the UE 100. The UE capability enquiry message may include information for enquiring about dual connectivity capability (DC capability) of the UE 100.

In step S202, the UE 100 transmits UE capability information to the MeNB 200A. The UE capability information includes information indicating dual connectivity capability.

Information indicating dual connectivity capability includes information indicating at least one of: "non (the UE 100 does not support the dual connectivity scheme (that is, the UE 100 supports neither the UP1A architecture nor the UP3C architecture))"; "1A (the UE 100 may support the UP1A architecture)"; "3C (the UE 100 may support the UP3C architecture)"; and "both (the UE may support both the UP1A architecture and the UP3C architecture)." For example, information indicating the dual connectivity capability may be expressed by the following two patterns (a) or (b).

(a) DC-capability=ENUM (Non, 1A, 3C, Both, . . . )
(b) 1A-capability=ENUM (yes, no), 3C-capability=ENUM (yes, no)

In step S203, the MeNB 200A monitors the load situation of at least one of the SeNB 200B, the S-GW 300A and an MME 300B. The MeNB 200A may perform the process of step S203 if the UE 100 supports the dual connectivity scheme. The MeNB 200A may monitor the load situation of (a plurality of) neighboring SeNBs 200B on the basis of a neighbor list. Alternatively, the MeNB 200A may monitor the load situation of the SeNB 200B around the UE 100 on the basis of a measurement report from the UE 100 and/or location information about the UE 100.

In step S204, the MeNB 200A selects a user plane architecture applied to the UE 100 on the basis of information indicating dual connectivity capability and the load situation of the SeNB 200B, the S-GW 300A, and the MME 300B. In the present embodiment, description is continued assuming that the MeNB 200A has selected either of the UP1A architecture or the UP3C architecture. Therefore, the MeNB 200A (RRM) determines to add a radio resource of the SeNB 200B in addition to a radio resource of the MeNB 200A to transfer the user data of the UE 100. Alternatively, the MeNB 200A determines to modify the radio resource of the SeNB 200B if the MeNB 200A has received allocation information of the radio resource of the SeNB 200B.

In FIG. 10, arrows by dashed lines (S210, S211, S213, S215 to S217) indicate signaling of a case in which the MeNB 200A selects the "UP1A architecture" (that is, signaling about data pass (SCG bearer) according to the selected UP1A architecture).

In step S205, the SeNB 200B (RRM) determines to modify the radio resource of the SeNB 200B.

In step S206, the MeNB 200A transmits an SeNB addition request or an SeNB modification request to the SeNB 200B. The SeNB addition request is a request for radio resource allocation. The SeNB modification request is a request for radio resource modification.

The SeNB addition request and the SeNB modification request include a dual connectivity architecture indication (a DC architecture indication). The dual connectivity architecture indication includes information indicating the user plane architecture (the UP1A architecture/the UP3C architecture) selected by the MeNB 200A in step S204, and an identifier of the UE 100 to which the selected user plane architecture is applied. Therefore, the SeNB 200B can know the user plane architecture selected by the MeNB 200A, and the UE 100 to which the selected user plane architecture is applied.

In step S207, the SeNB 200B (RRM) determines whether to approve the request from the MeNB 200A. In particular, the SeNB 200B determines whether to approve communication using the user plane architecture selected by the MeNB 200A. The SeNB 200B also determines whether to approve addition or modification of a radio resource.

If the SeNB 200B determines to approve the request from the MeNB 200A, the SeNB 200B allocates the radio resource in an L1 layer and an L2 layer. The SeNB 200B may allocate a RACH preamble dedicated for the UE 100 so that the UE 100 can perform synchronization of radio resource setting of the SeNB 200B.

Hereinafter, description is continued assuming that the SeNB 200B has determined to approve the request from the MeNB 200A.

In step S208, the SeNB 200B transmits an SeNB addition command or an SeNB modification command to the MeNB 200A.

The SeNB addition command and the SeNB modification command include new radio resource setting for the selected user plane architecture.

The MeNB 200A performs the process of step S209 upon reception of the SeNB addition command or the SeNB modification command. Note that the MeNB 200A may perform the process of step S206 again if a response that the request from the MeNB 200A is to be refused is received, and if the new radio resource setting is not approved.

In step S209, the MeNB 200A transmits an RRC connection reconfiguration message to the UE 100. The UE 100 that has received the RRC connection reconfiguration message starts application of the new setting.

The RRC connection reconfiguration message includes the dual connectivity architecture indication. The dual connectivity architecture indication includes information indicating the user plane architecture (the UP1A architecture/the UP3C architecture) selected by the MeNB 200A. The UE 100 knows the selected user plane architecture on the basis of the dual connectivity architecture indication.

In step S210, the MeNB 200A transfers, to the SeNB 200B, a sequence number (SN) of transmission data to the UE 100.

In step S211, the MeNB 200A transmits (transfers), to the SeNB 200B, untransmitted data to the UE 100.

In step S212, the UE 100 transmits an RRC connection reconfiguration complete message to the MeNB 200A.

In step S213, the UE 100 and the SeNB 200B perform a random access procedure. The UE 100 synchronizes with the cell of the SeNB 200B if necessary.

In step S214, the SeNB 200B transmits an SeNB addition complete message or an SeNB modification complete message to the MeNB 200A.

The SeNB addition complete message and the SeNB modification complete message include information indicating that the SeNB 200B and the UE 100 are synchronized. Upon reception of the SeNB addition complete message and the SeNB modification complete message, the MeNB 200A determines that the selected user plane architecture has been applied to the UE 100.

If the UP3C architecture has been selected, the MeNB 200A and the SeNB 200B start transmission and reception of the user data based on the UP3C architecture with the UE 100.

In step S215, the MeNB 200A transmits an E-RAB modification indication to the MME 300B.

In step S216, the S-GW 300A and the MME 300B perform bearer modification.

In step S217, the MME 300B transmits an E-RAB modification confirmation message to the MeNB 200A.

If the UP1A architecture has been selected, the MeNB 200A and the SeNB 200B start transmission and reception of the user data based on the UP1A architecture with the UE 100.

(2.2) Operation Sequence 2

Next, an operation sequence 2 is described with reference to FIG. 11. Differences from the above operation sequence 1 are described mainly and descriptions of the same components as those of the operation sequence 1 are omitted.

In the above operation sequence 1, the control apparatus that selects a user plane architecture applied to the UE 100 is provided in the MeNB 200A. In the operation sequence 2, the control apparatus is provided in an OAM 400.

In the operation sequence 2, a predetermined user plane architecture is applied to the UE 100, and the MME 200A and the SeNB 200B perform communicate with a UE 100 in a dual connectivity scheme.

In step S301, the OAM 400 transmits a dual connectivity capability (a DC capability) message to the SeNB 200B.

The dual connectivity capability message includes information indicating the user plane architecture (the single connection architecture (non)/the UP1A architecture (1A)/the UP3C architecture (3C)) selected by the OAM 400. The OAM 400 selects, for example, the user plane architecture in accordance with the kind of the X2 interface.

Note that the dual connectivity capability message may also include latency information indicating the communication delay time of the backhaul link, and information indicating an interface type in the backhaul link. The dual connectivity capability message may also include an identifier of the UE 100 to which the selected user plane architecture is applied.

The OAM 400 transmits the dual connectivity capability message to the SeNB 200B instead of the MeNB 200A, and the SeNB 200B manages the information. Therefore, the MeNB 200A can reduce management load compared with a case in which each SeNB 200B located in a large cell manages the information.

In step S302, the MeNB 200A determines to add the radio resource of the SeNB 200B for the transfer of the user data of the UE 100. Alternatively, the MeNB 200A determines to modify the radio resource of the SeNB 200B.

In step S303, the SeNB 200B determines to modify the radio resource of the SeNB 200B. The SeNB 200B may determine to modify the radio resource on the basis, for example, of that the quality of wireless communication quality of the UE 100 has been varied.

In step S304, the MeNB 200A transmits the SeNB addition request or the SeNB modification request to the SeNB 200B. Here, unlike step S206, the SeNB addition request and the SeNB modification request do not include any dual connectivity architecture indication.

In step S305, the SeNB 200B approves setting modification of the radio resource (i.e., addition or modification of the radio resource) on the basis of the dual connectivity capability message received from the OAM 400A. The SeNB 200B may refuse the setting modification of the radio resource on the basis of the dual connectivity capability message.

As in step S207, the SeNB 200B may allocate a RACH preamble dedicated for the UE 100 so that the UE 100 can perform synchronization of radio resource setting of the SeNB 200B.

In step S306, the SeNB 200B transmits the SeNB addition command or the SeNB modification command to the MeNB 200A.

The SeNB addition command and the SeNB modification command include information indicating the user plane architecture selected by the OAM 400 in addition to the new radio resource setting for the selected user plane architecture.

Steps S307 to S315 correspond to steps S209 to S217.

Other Embodiments

The present disclosure has been described with an embodiment. However, it should not be understood that the description and drawings constituting a part of the present disclosure limit the present disclosure. From the present disclosure, a variety of alternate embodiments, examples, and applicable techniques will become apparent to one skilled in the art.

In the above embodiment, the MeNB 200A may select the user plane architecture on the basis of FGI (Feature Group Indicator(s)) instead of the UE capability information.

In the above embodiment, the situation of communication between the MeNB 200A and the SeNB 200B and the situation of communication between the MeNB 200A and the MME/S-GW 300 may be determined on the basis of at least one of flow control information and TNL (Transport Network Layer) information.

In the above embodiment, in the eNB 200, the selected user plane architecture is included in the RRC connection reconfiguration message. Alternatively, the selected user plane architecture may be included in an RRC connection establishment message.

In the operation sequence 1 according to the above embodiment, the OAM 400A may transmit the dual connectivity capability message to the MeNB 200A. If the MeNB 200A receives a dual connectivity capability message that does not include an identifier of the UE 100 from the OAM 400, a UE capability enquiry message may be provided to the UE 100 that needs to connect. Note that the OAM 400A may transmit a dual connectivity capability message that includes, for example, the latency information indicating the communication delay time of the backhaul link to the MeNB 200A as in the above operation sequence 2.

In the operation sequence 1 according to the above embodiment, the eNB 200 may provide, to the core network (at least one of the S-GW 300A, the MME 300B, and the OAM 400), the selected user plane architecture and the UE 100 to which the selected user plane architecture is applied.

In operation sequence 2 according to the above embodiment, the eNB 200 (i.e., the MeNB 200A or the SeNB 200B) may perform an enquiry about dual connectivity to the OAM 400, and the OAM 400 may provide the dual connectivity capability message to the eNB 200 as a response to the enquiry. If the UP3C architecture can be applied to the UE 100 on the basis of the capability information from the UE 100, the eNB 200 may make the enquiry to the OAM 400 before performing step S302.

The control apparatus is provided in the OAM 400 in the operation sequence 2 according to the above embodiment, but this configuration is not restrictive. The control apparatus may also be provided in the SeNB 200B in addition to the OAM 400.

In that case, the MeNB 200A may transmit, to the SeNB 200B in step S304, the SeNB addition request or the SeNB modification request including the UE capability information acquired by performing the UE capability enquiry before step S304.

In step S305, the SeNB 200B can select the user plane architecture for each UE 100 on the basis of the dual connectivity capability message including, for example, the latency information received from the OAM 400A, and the UE capability information received from the MeNB 200A.

In the above embodiment, the control apparatus may be provided in the SeNB 200B. For example, the SeNB 200B in which the control apparatus is provided may transmit, to the MeNB 200A, an SeNB addition request or an SeNB modification request including information indicating a user plane architecture (i.e., a UP1A architecture/a UP3C architecture) selected by the SeNB 200B. In that case, the MeNB 200A determines whether to approve communication using the user plane architecture selected by the SeNB 200B. If the MeNB 200A is to refuse the communication using the user plane architecture selected by the SeNB 200B, the MeNB 200A may transmit, to the SeNB 200B, a response that the request from the SeNB 200B is to be refused. In that case, the MeNB 200A may transmit alternatives about the user plane architecture to the SeNB 200B. For example, the MeNB 200A can propose the UP3C architecture if the architecture selected by the SeNB 200B is the UP1A architecture. The MeNB 200A may transmit alternatives with a response that the request is to be refused.

Similarly, in the above embodiment, if the SeNB 200B refuses the communication using the user plane architecture selected by the MeNB 200A, the SeNB 200B may transmit alternatives about the user plane architecture to the MeNB 200A.

Further, in the above embodiment, the control apparatus (MeNB 200A, SeNB 200B, OAM 400, etc.) selects a user plane architecture applied to the UE 100, out of the plurality of user plane architectures, on the basis of a situation of the network and/or a situation of the UE 100; however, this is not limiting. For example, the control apparatus may select a user plane architecture applied to the UE 100 on the basis of a rule defined by an operator. Alternatively, the control apparatus may select a user plane architecture applied to the UE 100 in accordance with the number (or ratio) of the already applied user plane architectures. For example, the control apparatus may select a UP1A architecture without selecting the UP3C architecture when the number of UEs that exchange user data on the basis of a UP3C architecture is equal to or more than a threshold value. Alternatively, the control apparatus may select the UP1A architecture without selecting the UP3C architecture when the number of UEs that exchange user data on the basis of the UP3C architecture relative to the total number of UEs within the cell managed by the MeNB 200 (or the number of UEs that exchange the user data on the basis of the UP1A architecture) is equal to or more than a threshold value.

[Additional Statement]

(1) Introduction

The new work item on Dual Connectivity was approved. One of the work item objectives is to introduce functions and procedures to realize the different types of user plane architectures i.e., 1A and 3C identified during the study phase. In the Additional Statement, we analyze whether both 1A and 3C need to be deployed in a network.

(2) Constraints Under Dual Connectivity User Planes

Pros and cons of the architectures for various aspects are identified as follows.

Per-user throughput gain: 3C is expected to have higher gain than 1C.

Backhaul impacts: 3C has tougher requirements compared to 1A due to the non-ideal Xn interface, while 1A has no impact for user plane data transfer.

One of MeNB hardware impacts: Additional PDCP processing will be needed at the MeNB to support SeNB with architecture 3C.

One of the UE hardware impacts: 3C requires re-ordering processing.

In other words, the higher throughput gain from 3C comes at the cost of considerable impacts on hardware in both the network and the UE. This is one of reasons why two architectures were agreed as the baseline going for the work item phase.

Observation 1: UP3C architecture is expected to have higher per-user throughput gain, but tighter requirements are expected of the network's hardware.

For the backhaul assumption, packet loss and out-of-sequence delivery on Xn is rare in reasonable load conditions. It means that dual connectivity should maintain backhaul load on the path between MeNB and SeNB in reasonable condition as much as possible for stable operations. However the assumption of non-ideal backhaul means limited capacity. For example, the contribution introduced characteristics of a practical backhaul which imply Xn connection may have 1 Gbps throughput. The demands on backhaul depend on both user plane architecture and the number of UEs using dual connectivity, assuming there are enough resources available at the MeNB to support the dual connectivity UEs.

Observation 2: Network should take into account the user plane architecture and the number of dual connectivity UEs even if the backhaul is well-dimensioned by the operator.

(3) Use Case for Mixed Architecture Network

As discussed above, it's important to consider maximizing per-user throughput with backhaul in reasonable load condition. As an example of the simultaneous deployment of 1A and 3C in the same network, it may be assumed the MeNB would initiate 3C for a UE to maximize per-user throughput if the backhaul load is under reasonable condition. However, in case the MeNB's backhaul becomes congested on either the common link (between MeNB 200A and Router in FIG. 7B) or on the specific link (between SeNB 200B and Router in FIG. 7B) due to the increased number of 3C-connected UEs, the MeNB should have the option to initiate dual connection with 1A other UEs in order to avoid backhaul overloading. In this manner, the mixed architecture network can facilitate optimal balancing between QoE and stable operation by offering the flexibility for the MeNB to select the appropriate UP architecture on a per-UE basis.

Proposal 1: It should assume that both 1A UEs and 3C UEs may be simultaneously activated in a network.

(4) Category of Mixed Architecture

If the Proposal 1 is adopted, the support for switching between normal bearer and 1A bearer or between normal bearer and 3C bearer should be adopted. It should also be assumed that such switching between normal bearer and dual-connectivity bearer can be accomplished through RRC Connection Reconfiguration.

Proposal 2: Architecture selection of 1A/3C with RRC Connection Reconfiguration should be adopted as the baseline.

In addition to the baseline proposal above, more flexible schemes with per-bearer switching were brought up. The switching scheme assumes not only direct switching between 1A and 3C for a dual-connected bearer, but also mixed architecture per-UE whereby the UE may be configured with both 1A bearer and 3C bearer simultaneously.

Observation 3: It is for further study if a 1A bearer can be directly reconfigured to be a 3C bearer and vice versa (FFS 1).

Observation 4: It is also for further study if a UE can be configured with both 1A bearer and 3C bearer simultaneously (FFS 2).

The direct switching scheme described in FFS 1 has the advantage of reducing the number of RRC signaling messages necessary to reconfigure a bearer between 1A and 3C. With the baseline assumption in the Proposal 2, it may be assumed that reconfiguration of established bearers between non-dual-connectivity and dual-connectivity can be supported and not just for newly established bearers. Additionally, it has already agreed that the UE should support dual MAC layers for the MCG and the SCG. Therefore, the support for direct reconfiguration of a bearer between 1A and 3C should not increase UE complexity. Therefore, the direct reconfiguration of a bearer between 1A and 3C should be supported.

Proposal 3: The reconfiguration of a bearer between 1A and 3C should be supported.

With regards to the mixed architecture described in FFS 2, there are some potential benefits in terms of congestion control according to the QCI of each bearer. However, the benefits should be weighed against the increased UE complexity esp. in the PDCP layer and the possible increase in UE power consumption. Further discussion will be necessary to justify the support of FFS 2.

Proposal 4: RAN2 should assume as a working assumption that Rel-12 UE cannot be configured with both 1A and 3C bearers simultaneously.

(5) RRC Configuration Reconfiguration for Dual Connectivity

Assuming Proposal 2 is agreed, it should consider an efficient mechanism for the network to specify the UP architecture 1A or 3C for dual connectivity. This means RRC Connection Reconfiguration should be enhanced to allow the MeNB to inform the UE of the selected UP architecture.

Proposal 5: RRC Configuration Reconfiguration should indicate to the UE the selected UP architecture for dual connectivity.

(6) SeNB Addition/Modification

With non-ideal backhaul deployments, unnecessary signaling on X2 should be avoided because it will directly impact on latency of the procedure. Depending on the backhaul condition of the MeNB, the MeNB may decide to configure the UE with either 1A or 3C for dual connectivity. This means the MeNB must have a means to inform the SeNB of the requested UP architecture for the UE. This request may be simply included in the existing SeNB Addition/Modification procedure.

Proposal 6: SeNB Addition/Modification procedure should include an indicator for the selected UP architecture for dual connectivity.

If the proposal 6 is agreeable, the SeNB should be allowed to decide if the requested UP architecture from the MeNB is acceptable to the SeNB. This may be necessary since the MeNB may not know the backhaul condition of the SeNB.

Proposal 7 SeNB should have a means for informing the MeNB whether the MeNB's proposed UP architecture is acceptable or not.

Assuming the SeNB decides to reject the request, there are multiple alternatives that may be considered.

ALT 1: The SeNB has the option to indicate in the Addition/Modification Command that it has rejected the UP architecture requested by the MeNB.

Option 1: The SeNB includes an alternate UP architecture within the RRC container of the Addition/Modification Command as a counter proposal to the MeNB's UP architecture request.

Option 2: The SeNB includes a new indicator in the Addition/Modification Command with the following sub-options.

Option 2-1: The new indicator is a 1-bit indicator to inform the MeNB whether the UP architecture requested is acceptable.

Option 2-2: The new indicator is an enumerated indicator containing the choice of UP architecture (1A or 3C) acceptable to the SeNB.

ALT 2: A new indication message, e.g. Addition/Modification Failure may be used by the SeNB to reject the requested UP architecture.

Option 1: The SeNB includes a cause in the Addition/Modification Failure, which indicates the reason of the failure (UP architecture rejected).

Option 2: The SeNB includes a new indicator in the Addition/Modification Failure with the following sub-options.

Option 2-1: The new indicator is a 1-bit indicator to inform the MeNB whether the UP architecture requested is acceptable.

Option 2-2: The new indicator is an enumerated indicator containing the choice of UP architecture (1A or 3C) acceptable to the SeNB.

ALT 1 has the advantage that the Addition/Modification Command may be reused; however, since the SeNB uses the RRC container to indicate the counter proposal or rejection, it will be necessary for the MeNB to interpret/comprehend the information from the SeNB in order to receive the rejection notification.

Observation 5: With ALT 1, the MeNB will need to interpret/comprehend the information from the RRC container in order to receive the counter proposal or rejection notification.

With either alternative, the SeNB has the option to request an acceptable configuration(s) as a counter proposal to the MeNB's initial request. However, this would also imply that the MeNB should also be allowed to consider the SeNB's counter proposal or rejection. In particular, upon receiving the counter proposal or rejection from the SeNB, the MeNB should also have the following options.

If the MeNB receives the rejection indication from the SeNB (option 2-1 of either alternative), the MeNB may send an updated SeNB Addition/Modification Request to request a different UP architecture.

If the MeNB receives the counter proposal sent from the SeNB (option 2-2 of either alternative), the MeNB may decide whether the counter proposal from the SeNB is acceptable or not. Since there are currently only two UP architectures to select from, in principle, these counter proposals should only last no more than one iteration. However, it is also possible that neither UP architecture may be satisfactory to both MeNB and SeNB, in which case dual connectivity may not be possible.

Proposal 8: If Proposal 7 is agreeable, it should also consider if the rejection or counter proposal functionality in either alternative should be adopted.

(7) Supporting Various Types of UEs

As identified, user plane architecture 3C will add complexity and hardware impacts to the UE. These include the increased processing power, and buffer size that is needed to take into account of the extensive re-ordering due to out-of-sequence deliveries. And this is in addition to the requirement to support dual Rx/Tx just to support 1A.

There are many types of devices that support LTE, e.g. high-end smartphones, voice call handsets, low-cost devices or MTC devices. Some devices may need to support dual connectivity with 3C for high speed data transfers, while other devices may have no use for such a feature esp. due to the potential increase in hardware cost. Therefore it should not be assumed that all of Rel. 12 UEs will support both user plane architectures, even if dual connectivity is supported.

Proposal 9: It should not assume that all of Rel-12 UEs can support both user plane architectures.

If proposal 7 is agreed, the eNB should be informed of the UE capability prior to the configuration of dual connectivity.

Proposal 10: UE capabilities for the support of specific user plane architecture for dual connectivity should be supported.

(8) Conclusion

In the Additional Statement, we would discuss use cases and possible mechanisms to support selection of user plane alternative for dual connectivity.

INDUSTRIAL APPLICABILITY

As described above, the mobile communication system, the control apparatus, the base station, and the user terminal according to the present embodiment are possible to appropriately control a dual connectivity scheme when a plurality of user plane architectures are available, and thus they are useful in the mobile communication field.

The invention claimed is:

1. A first base station, comprising:
a controller, wherein
the controller is configured to directly receive capability information from a user terminal,
the capability information indicates whether the user terminal supports a first architecture in which a SCG (Secondary Cell Group) bearer is used and whether the user terminal supports a second architecture in which a split bearer is used,
the SCG bearer is a bearer which goes via both a serving gate way and a second base station without going via the first base station,
the split bearer is a bearer which goes via both the serving gate way and the first base station, and which is split in a PDCP (Packet Data Convergence Protocol) layer of the first base station,
one split path of the split bearer goes via the second base station,
another split path of the split bearer does not go via the second base station and goes via the first base station, and
the controller is configured to configure either the SCG bearer or the split bearer to a user terminal without simultaneously configuring both the SCG bearer and the split bearer even when the user terminal has indicated that it supports both the first architecture and the second architecture.

2. The first base station according to claim 1, wherein
the controller is configured to transmit a RRC (Radio Resource Control) connection reestablishment message to a user terminal, and
the RRC connection reestablishment message includes information for indicating whether user plane architecture in dual connectivity is the architecture in which the SCG bearer is used or the architecture in which the split bearer is used.

3. A control method, comprising:
directly transmitting, by a user terminal, capability information to a first base station, wherein the capability information indicates whether the user terminal supports a first architecture in which a SCG (Secondary Cell Group) bearer is used and whether the user terminal supports a second architecture in which a split bearer is used;
directly receiving, by the first base station, the capability information from the user terminal, wherein
the SCG bearer is a bearer which goes via both a serving gate way and a second base station without going via the first base station,
the split bearer is a bearer which goes via both the serving gate way and the first base station, and which is split in a PDCP (Packet Data Convergence Protocol) layer of the first base station,
one split path of the split bearer goes via the second base station,
another split path of the split bearer does not go via the second base station and goes via the first base station, and
the control method further comprises
configuring, by the first base station, either the SCG bearer or the split bearer to a user terminal without simultaneously configuring both the SCG bearer and the split bearer even when the user terminal has indicated that it supports both the first architecture and the second architecture.

\* \* \* \* \*